Figure 5:
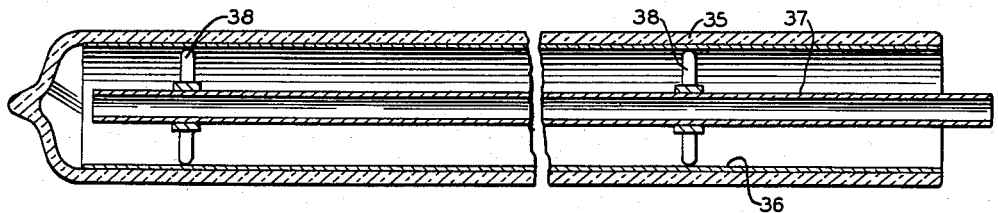

Nov. 3, 1959
G. W. TRAVER
2,910,723
METHOD AND MEANS FOR TREATING NON-ADHERENT
SURFACES TO RENDER THEM ADHERENT
Filed Feb. 27, 1956
3 Sheets-Sheet 1
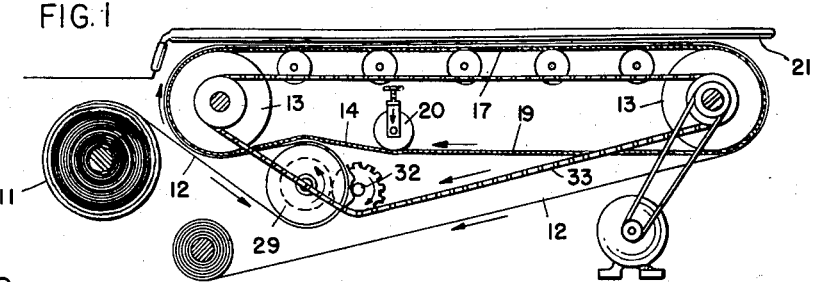
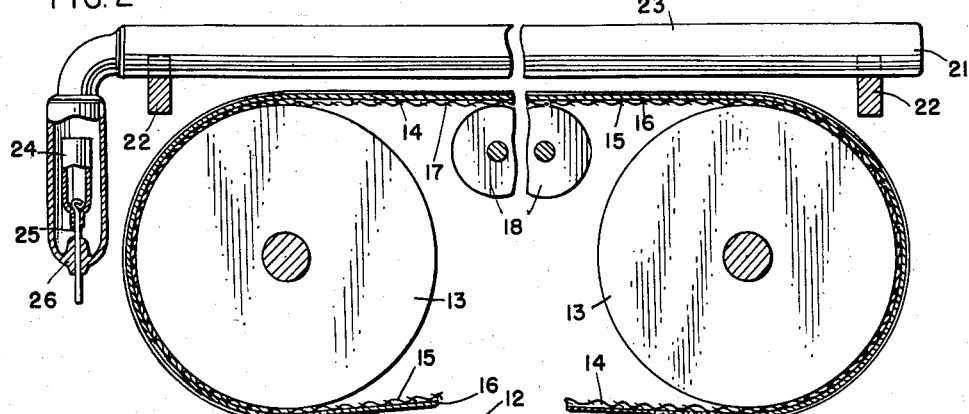
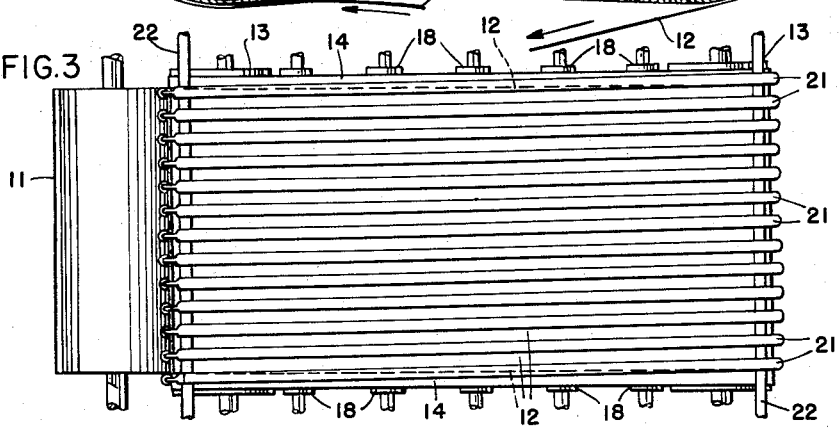
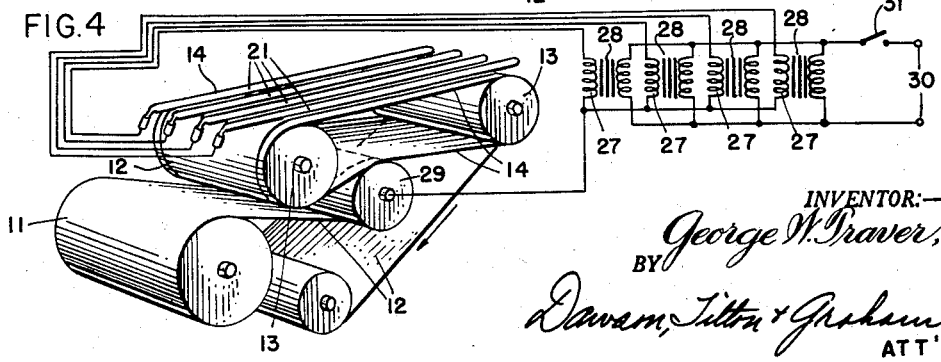
INVENTOR:—
George W. Traver,
BY
Dawson, Tilton & Graham,
ATT'YS Nov. 3, 1959  G. W. TRAVER  2,910,723
METHOD AND MEANS FOR TREATING NON-ADHERENT
SURFACES TO RENDER THEM ADHERENT
Filed Feb. 27, 1956  3 Sheets-Sheet 2

INVENTOR:
George W. Traver,
BY
Dawson, Tilton & Graham,
ATT'YS.

Nov. 3, 1959
G. W. TRAVER
2,910,723
METHOD AND MEANS FOR TREATING NON-ADHERENT
SURFACES TO RENDER THEM ADHERENT
Filed Feb. 27, 1956
3 Sheets-Sheet 3
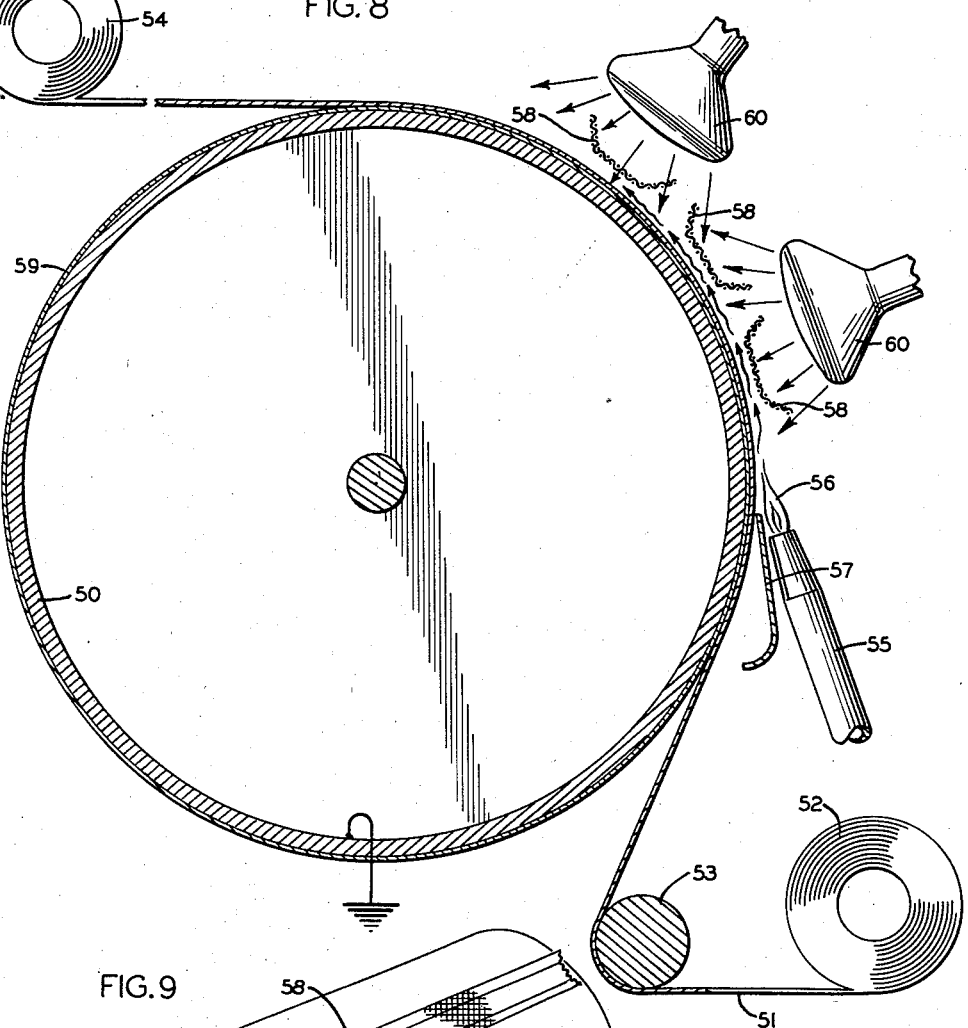
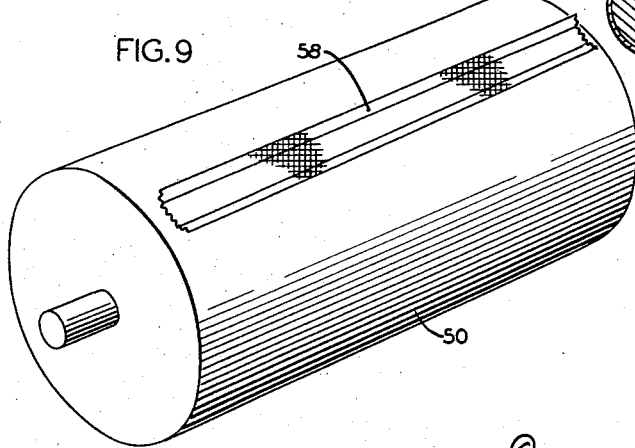
INVENTOR:
George W. Traver,
BY
Dawson, Tilton & Graham,
ATT'YS.

United States Patent Office 2,910,723
Patented Nov. 3, 1959

2,910,723

METHOD AND MEANS FOR TREATING NON-ADHERENT SURFACES TO RENDER THEM ADHERENT

George W. Traver, Chicago, Ill., assignor to Traver Investments, Inc., Chicago, Ill., a corporation of Illinois Application February 27, 1956, Serial No. 568,122

12 Claims. (Cl. 18—1)

This invention relates to a method and means for treating non-adherent surfaces to render them adherent. The invention is particularly useful in the treating of surfaces of plastic bodies which are normally not receptive to ink, coloring matter, floc, adhesive, and other added materials to render the surfaces strongly adherent to such materials. The invention is further particularly useful in connection with the treating of such plastic surfaces through the use of an electrostatic force field while reducing the voltage requirements and eliminating the corona, etc.

This invention is a continuation-in-part of my copending application Serial No. 345,015, filed March 27, 1953, which in turn is a continuation of my copending application Serial No. 277,320, filed March 18, 1952, now abandoned, which in turn is a continuation-in-part of my copending application (now abandoned), Serial No. 192,313, filed October 26, 1950.

It is known that the surfaces of many types of materials or bodies are relatively non-adherent to inks, adhesives, decorating matter, and a large number of added materials, and after application of such materials to the surfaces, it is found that the materials disintegrate and fall away or are rubbed off readily, etc. For example, when inks or decorative material or adhesives are applied to the surface of a bottle or other object formed of polyethylene, or to the surface of a polyethylene film, it is found that the inks, adhesives, pigments, etc., fail to adhere to the surfaces and are easily removed.

In attempts to laminate various types of plastic materials, it is found that certain plastics are incapable of retaining the adhesive or other bond placed thereon and after use, the adhesive separates from the non-adhering surface of the plastic.

Similarly, attempts at color-coding polyethylene-coated electrical wire or cable have been unsuccessful because of the non-adhering character of the plastic surface. Efforts to secure floc or other objects or decorative material to plastic surfaces have similarly been unsuccessful where such surfaces have the property of non-adherence to the bonding materials, adhesives, etc.

Plastic material of the type now commonly employed in thin, relatively transparent sheets and in other forms for wrapping and packaging purposes, has presented especially difficult problems where such plastic material is nonreceptive to inks, pigments, adhesives, etc., due to the extremely smooth and impervious surface of the plastic material. For example, polyethylene film and similar films which are non-adherent with respect to inks, pigments, adhesives and other decorative or added materials, have been largely limited in usefulness because of the inability to print upon, decorate or laminate such film or films.

In the treatment of polyethylene and similar non-adherent films through the use of an electrostatic force field or electron bombardment employing spaced electrodes between which the film passes, a problem is present due to the tendency to form a corona and to produce ozone in the treating operation, while at the same time requiring a rather high voltage. When, however, the operation is carried on under certain controlled conditions, it is possible to eliminate the corona and the formation of ozone and to reduce the voltage required in the operation.

An object of the present invention is to provide a method employing conditions under which effective treatment of polyethylene and similar film is brought about for rendering the same adherent to inks, etc., while at the same time carrying on the treating operations under conditions which do not produce a corona or form ozone and while also reducing the voltage requirements. A further object is to treat difficultly-adhering surfaces or non-adhering surfaces through the action of an electrostatic force field to change the character of the surfaces and to cause them to adhere to added materials, the electrostatic force field being produced with a reduced voltage and avoiding the forming of a corona. Yet another object is to expose the surface to be imprinted, decorated, laminated, etc. to an electrostatic field of substantial intensity, whereby a rapid modification of the surface is effected, rendering it receptive and adherent to the added materials. A still further object is to provide a method and means for moving the material to be treated, together with a conductor carrier therefor, in the electrostatic field and concurrently as the treatment is being effected. Yet another object is to provide a high frequency method of electron bombardment which is effective in rendering the film surface adherent to added materials while at the same time avoiding corona and the formation of ozone. Yet a further object is to provide, in combination with an electrostatic force field for the treatment of a film surface, separate means for pre-ionizing the path of electron flow between an electrode and the film, whereby lower voltages may be employed and effective treatment of the film surface carried on without the production of a corona or ozone. Other specific objects and advantages will appear as the specification proceeds.

The electrostatic force field may be provided by a series of elongated tubular discharge lamps arranged in banks and in staggered relation or in overlapping relation, the banks of tubes extending over each other and extending in different directions, or arranged in any desired way for forming a continuous electrostatic force field below.

In one embodiment of the invention, I provide apparatus in which an electrostatic force field is provided while causing objects having the surfaces to be treated traversed or exposed to the field sufficiently for changing the surfaces to relatively adherent surfaces. For example, a plurality of elongated tubular discharge lamps are disposed in parallel, side-by-side and adjacent relationship in combination with means for supporting the material to be treated closely adjacent the lamps while also providing means for relatively moving the material with respect to the lamps so that the surfaces thereof to be treated traverse the electrostatic field established by the operation of the lamps and preferably at a substantially uniform distance from the lamps. In such apparatus, I prefer to employ a conductor carrier for the material which forms, with the electric elongated tubular discharge lamps, the electrostatic field about the material to be treated, and I prefer to have the material to be treated travel concurrently with the conductor carrier. While not necessary, I have found it desirable to arrange the lamps in a direction slightly skewed, or angularly displaced from the longitudinal direction of the sheet material, whereby each surface portion of the treated sheet may be exposed to the electrostatic field of more than one of the lamps during the passage of the sheet through the field. Further, in such apparatus, I prefer to provide support means for sheet material to be treated, comprising a sheet or plate of electrical-conducting material spaced from the treatment lamps and upon which the sheet material to be treated may be supported in closely-spaced relationship with respect to the lamps during the passage of the material through the treatment so established by operation of the lamps. My preferred support for such material is an endless belt of electrical-conducting material mounted on and supported by suitable rollers, including means for tensioning the belt so that the sheet metal supporting length or stretch may be maintained in uniform spaced relation with respect to the treatment lamps throughout the treatment zone.

The invention is shown, in a specific illustrative embodiment, by the accompanying drawing, in which—

Figure 6:
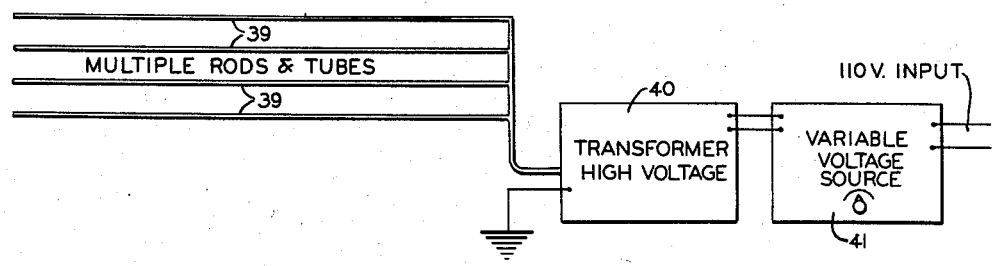
Figure 7:
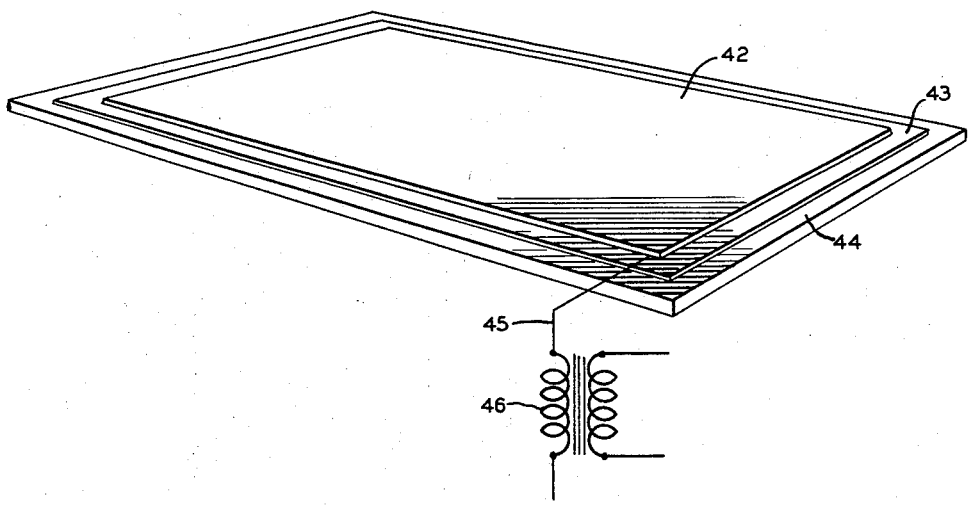

Figure 1 is a side view in elevation of apparatus for treating non-adherent material in accordance with the present invention; Fig. 2, an enlarged broken sectional view of a portion of the apparatus shown in Fig. 1; Fig. 3, a top plan view; Fig. 4, a diagrammatic view of the apparatus and associated wiring layout; Fig. 5, a vertical sectional view of apparatus illustrating a modified form of the invention; Fig. 6, a schematic layout illustrating another modification of the invention; Fig. 7, a perspective view of a modified form of structure with which the invention may be employed; Fig. 8, a schematic view in elevation of apparatus embodying a modified form of the invention; and Fig. 9, a perspective view of a wire mesh electrode which may be employed in conjunction with the support roller.

In the illustration given in Figs. 1 to 4, inclusive, the material which is to be treated in the apparatus illustrated is in the form of a film of plastic, such as polyethylene. A roll 11 of the plastic material 12, in the form of a film or web, may be mounted in a suitable support frame and guided into and through an electrostatic treatment zone. To this end, the support frame is shown provided with a pair of spaced guide rollers 13, carrying thereon an endless belt 14 of electrical-conducting material. This belt may conveniently comprise a fabric base 15, which is desirable to give strength to the structure, and a surface coating 16 of electrical-conducting material adhered upon the outer surface of the fabric base. The film of plastic material 12 may be drawn continuously from the roll 11 and guided around the rollers 13 and upon the conducting surface of the belt 14, the web 12 being thus supported between the rollers 13 upon the upper stretch 17 of the belt 14, which may be, and preferably is, supported between the rollers 13 upon one or more stretch-supporting rollers 18. The stretch-supporting rollers 18 thus enable the web of plastic material 12 to be held in a substantially flat plane. The lower stretch 19 of the belt 14 may travel on a roller 20 which is adjustable in order to tension the belt on the rollers 18 and thus aid in maintaining the upper sheet-supporting stretch 17 thereof in a flat plane.

Any suitable means for maintaining an electrostatic field may be employed. For example, the field may be produced readily and conveniently by the operation of tubular gaseous discharge lamps 21 in the vicinity of the path traversed by the web 12 between the rollers 13. To this end, the frame of the apparatus may be provided with mounting blocks 22, preferably of insulated material, forming seats for the reception of the tubular discharge lamps 21, said mounting blocks 22 being formed to support the lamps in closely-adjacent but spaced-apart and parallel relationship, the spacing of the lamp beings preferably about one-eighth of an inch and the lamps being disposed in a common plane so that the space between the lamps and the upper stretch 17 of the belt is also of the order of about one-eighth of an inch.

The lamps 21 shown in the drawing comprise a tubular glass envelope 23, hermetically sealed and charged with a gaseous-conducting medium such as argon. If desired, the glass envelope may be provided throughout its length with a ferrous compound or other electrical conductor of the type usually employed in tubes from which a discharge is made to a conductor therebelow. At one end, the tubular element 23 may be provided with an electrode 24 preferably comprising a hollow metal shell sealed within the tubular element and mounted upon a conducting stem 25 which projects outwardly of the element at its end, as through a glass-metal pinch seal 26, to allow for the electrical interconnection of the electrode in an external lamp energizing circuit. The electrode 24 of each of the lamps 21 may be electrically connected with one side of the secondary winding 27 of a corresponding transformer 28, a separate transformer being provided for energizing each of the lamps. The lamp remote ends of the secondary winding 27 of the several transformers may be interconnected in common and electrically connected with a roller 29 which, it will be noted, makes electrical contact with the conducting layer 16 of the belt 14. As shown, the roller 29 may form a guide roller for guiding the film web 12 from the roll 11 onto the belt 14. Said belt is preferably somewhat wider than the web 12, so that the roller 29 may make electrical contact with the belt layer 16 outwardly of the side edges of the web 12. As a consequence, the conducting layer of the belt which extends in the web-supporting stretch 17 will constitute an electrostatic plate extending on the side of the web 12 opposite from the lamps 23 to thereby aid in the establishment of an electrostatic field in the zone between the belt stretch 17 and the tubular lamps 21, when the lamps are in operation; and it will be seen that the web 12, in traveling between the rollers 13 upon the belt 14, will be caused to move progressively through such electrostatic treatment zone. The primary windings of the transformers 28 may be interconnected in parallel relationship and energized from a suitable source of alternating electrical power 30 for the operation of the lamps each through its corresponding transformer. Suitable switch means 31 may, of course, be provided for controlling the operation of the lamps.

When the lamps are in operation, the gaseous medium, with which the same are charged, will become ionized to provide a glass-enclosed column of gaseous conducting material in position extending parallel and closely spaced with respect to the electrically conducting belt layer 16. The gaseous conducting columns of the lamps, in combination with the conducting layer 16 of the conveyor belt, serve to establish an electrostatic force field between said layer and the gaseous columns. This field, in conjunction with the glass lamp envelopes which enclose the gaseous columns, will produce electrical discharge between the envelopes and the belt layer 16, and the discharge will be applied continuously to the film 12 as it passes between the lamps and the layer 16. As a consequence, the surfaces of the film 12 which face away from the layer 16 and towards the lamps 21 are rendered highly receptive and adhesive to common links and pigments used in printing, as well as being adherent to adhesives, decorative material, and other added materials.

Instead of employing the tubular glass lamps of the character described, it will be understood that any other suitable means for providing the electrostatic field may be used, the lamp structure which is shown being merely set out as illustrative of one form of means for producing the field. The lamps or other field-forming means may be located directly above and parallel to the belt, or, if desired, the material to be treated may be carried on a carrier disposed at an angle away from the longitudinal axis of the tubes. The material may be passed under the lamps a single time to effect treatment thereof, or a number of times, as desired. It is found that certain types of materials require longer exposure than others. It will be understood that the apparatus may be varied by increasing the length of the tubes or the number of longitudinally-arranged tubes, whereby treatment may be effected in a single pass or by a series of exposures.

In the specific illustration shown in Fig. 3, the lamps are skewed or inclined with respect to the direction of movement of the web 12 in the treatment zone. In this connection, the angle or pitch, at which the lamps are mounted, is preferably such that the opposite ends of each lamp are relatively displaced, in a direction transversely of the direction of movement of the web, a distance equal to, or a whole number multiple of, the spacement between the central axes of the lamps. Accordingly, each portion of the web throughout its entire width will be exposed to substantially the same quanta of treatment as is applied to every other web portion as the same is drawn at a uniform rate of speed through the treatment zone.

If high voltage is employed, it is found that the effective treating area below the lamps is greater and the lamps may not be so easily associated in order to give an unbroken area treatment of the polyethylene film or structure therebelow. However, if the voltage is low, I prefer to have the tubes closely associated so that there will be no spaced areas of treated material, unless, of course, such spaced area treatment is desired. For a thorough and complete treating of the surface therebelow, while using relatively low voltage, I prefer to employ tubes arranged in staggered relation or banks of tubes running in different directions so as to form an electrical field which completely covers the area of polyethylene which is to be treated.

Any suitable or preferred means may be employed to drive the belt 14, and to deliver the web 12 of plastic material thereon. To this end, as shown in the drawings, the roller 29 may be driven by gear means on a counter shaft 32. The counter shaft may in turn be driven by an endless chain 33 carried on gears or sprockets on the shaft 32 and on the shafts of the rollers 13; and a preferably electric motor 34 may be employed to drive the shaft of one of the rollers 13 and hence, through the chain 33, to drive the other roller 13 and the guide roller 29.

As a specific example of the process, the following may be set out: A sheet of polyethylene film is carried by the carrier belt 14 below tubes 21 of approximately 40 inches in length and having approximately 37 inches of effective length over the film. The carrier belt is operated at a speed of 100 feet a minute, and the voltage employed in connection with the tubes is approximately 10,000 volts. In the operation, the film is carried under the tubes a second time and the non-adhering character of the exposed surface of the film was found to be changed to a surface highly receptive to inks, pigments, decorative material, floc, adhesives, etc. Any of these added materials would be applied after the treatment described. For example, the film was found to be highly receptive to such materials and adherent thereto even though the treated film had been stored for months after the treatment.

Similarly, a bottle formed of polyethylene, after exposure to the tubes, was found to be changed in character with respect to receptiveness of inks, pigments, and decorative material, the exposed surface of the bottle being strongly adherent to adhesives and to ordinary inks, coloring pigments, etc. Similar plastic bodies having surfaces which were ordinarily non-adherent to such added materials, were found to become adherent to the materials as to those surfaces exposed within the electrostatic force field.

In addition to rendering the surfaces non-adherent after treatment to decorative material, inks, coatings, etc., I have found that the film or laminae are now readily laminated and united not only with film of like character, but with different types of film or laminae. For example, laminae of polyethylene may be readily secured to itself and other plastics. To render the plastic film or laminae receptive to the adhesive, the film is first exposed to the electrostatic field described, and then the second film treated in the same way. The adhesive is then applied to one or both of the treated surfaces which are to be joined. The two films or laminae are then brought into contact with each other, with the adhesive or treated sides together, and preferably maximum surface contact is obtained by rolling the two together between rollers. The adhesive may be of a polymerizing type with highly cohesive strength, but satisfactory binding can be had with a variety of types of adhesive and in some instances it is found that ordinary printing inks of a highly polymerizing type may be successfully used to laminate and provide color to the transparent films. Where the film is of a type which can be successfully laminated without treatment, it is not necessary to treat such a film and a good lamination is achieved by treating only the surface of the difficultly-adhering material.

The process is also effective in enabling color-coding of polyethylene-coated electrical wire or cable. After exposure of the polyethylene coating or other plastic coating, the color application is made and is found to be highly adherent to the plastic surface.

Similarly, a plastic surface to which floc or other decorative material cannot be successfully secured has been effectively covered with floc and other decorative material by first exposing the surface to the electrostatic field force as already described, and then applying adhesive to the treated surface, floc being blown then upon the adhesive surface or deposited thereon by other well-known means.

I am unable to explain why the surfaces of such bodies having the property of non-adherence to such added materials are changed by exposure to the electrostatic field so that they then become adherent. The appearance of the exposed surface to the naked eye is unchanged, but, whereas the surface was formerly nonreceptive to the materials, it has become, after the treatment, highly receptive and forms a strong union with the adhesives, bonding material, pigments, inks, floc, and other forms of decorative matter.

Certain tests made with a Beckmann recording infrared spectrophotometer indicate that the treatment with the electrostatic force field brings about a great increase of unsaturation of the surface polyethylene molecules or an increase in the amount of $R_2C=CH_2$ groups. These groups are produced by the degradation of the long chains, probably at points along the chain where the side branches are attached. The very substantial unsaturation produced by the treatment can also be ascertained quantitatively by measuring the weight of bromine vapor absorbed by the film in the dark. The tests gave no evidence of oxidation. Oxidation produces carbonyl groups, ketones and aldehydes, but no carboxyl groups. The carbonyl group has a strong absorption at $5.9\mu$, but none could be detected in the samples treated. Oxygen in any form also absorbs strongly between 8 and $10\mu$, but no indication of this existed. From the tests, it appears that the electrical treatment greatly increased the number of unsaturated linkages in the polyethylene surface molecules and that this treatment caused the surface now to become adherent to the decorative matter.

Polyethylene which has been thermally treated to render a surface thereof adherent to decorative matter, as by the application of a flame thereto, is found to have not only an increase in the unsaturated linkages or double bonds, but also there is evidence of oxidation. In contrast, the electrical treatment described herein, while giving the unsaturated linkages, yields no evidence of oxidation. Ultraviolet light, produced by the tubes employed, may have some effect in producing the results which have been described.

The present process, in which an electric field is brought to bear upon a polyethylene film, is found to be particularly useful and valuable in that the field can be applied to only selected areas. Thus, if it is desired to leave a portion of the film or body untreated in order that it may be more effectively heat-sealed, the electric field is applied only to the selected areas and the remainder of the film, etc. is unmodified. Thus, since the treatment reduces the heat-sealing quality of the film, certain bands of the film may be left untreated where heat-sealing is to be employed.

The time of exposure and the intensity of the electrical discharge or field will vary considerably, depending upon the type of polyethylene body, its configuration, etc., or the type of plastic other than polyethylene which is being treated. In the treatment of the polyethylene (I bring to bear upon the selected surface an electrostatic force field or electrical discharge of sufficient intensity to bring about an unsaturation of polyethylene molecules on the surface of the body being treated. The unsaturation of the polyethylene molecules occurring when such electrical discharge is made causes the character of the entire surface to be modified so that it now becomes adherent to the decorative matter or added materials.

In the modification shown in Fig. 5, I provide a single glass tube 35 having its interior lined with an electrical-conducting material 36 such as a ferrous compound or other metallic compound ordinarily employed in such a discharge tube. The outer end of the tube is closed, while the inner end which receives the electric conductor 37 is open. If desired, insulating spacer supports 38 may be used, or, in stead thereof, the rigid conductor 37 may be supported upon a means outside of the glass tube. The conductor 37 may be a copper tube to which current is supplied. If desired, the inner coating 36 may be omitted. The open end of the tube should be at a substantial distance from the belt conductor so that no direct discharge will take place from that portion of the copper tube 37 extending outside of the glass tube 35.

The method of treating polyethylene for better ink adherence includes a variety of means for forming the electrical field. The field may be formed by high voltage tubes, rods, screens, wires, or a variety of electrical-conducting material supplied with voltage by means of high voltage transformers, generators, rectifiers, or similar sources. In my former tests, each conductor was supplied with its own individual source of voltage. I have now found that the same treatment can be effected by using a single high voltage source for multiple tubes, rods, screens, etc., controlled by voltage variants.

In the structure shown in Fig. 6, a plurality of elements 39, which may be rods, tubes, screens, or other electrical conductors, are supplied with current from a high voltage transformer 40 connected to a variable voltage source 41, the source being supplied with input indicated in the drawing as 110 voltage input.

Instead of employing tubes, rods, screens, etc., as conductors, I may also employ a single metallic plate as a conductor. I prefer to employ with such a plate a glass shield, and, if desired, a conductive coating on the glass. In the illustration given in Fig. 7, I provide a metal foil such as aluminum foil 42, lying on a conductive coating 43, and beyond the coating 43 a glass plate 44. A lead 45 connects a transformer 46 with the foil 42. This structure is placed above a conveyor and conductor, as illustrated in Figs. 1 to 4.

In the operation of the structure shown in Fig. 7, the structure is placed above a plate of electrical-conducting material or a belt, as shown in Figs. 1 to 4. The voltage across the transformer secondary is then applied between the two conducting plates to form an electrical force field. The polyethylene to be treated is placed between the lower conducting plate or conveyor and the upper glass plate 44. By feeding the output of the voltage regular (employed with the transformer) across the primary of the transformer, it is possible to vary the output of the transformer, and thus the voltage between the plates. Although the area of the plate 44 was increased in tests carried on from 5 square inches to 150 square inches, all other factors remaining constant, there was no change in the treatment effected. The treatment was obtained regardless of the spacing between the glass plate 44 and the conductive plate spaced therebelow, so long as the spacing was not too great to prevent corona discharge between plates, nor so small that there was no air gap between the top surface of the polyethylene and the bottom side of the glass plate 44. Even treatment was obtained between the plate 44 and the conductive plate therebelow although the plates were approximately ¼ inch out of parallel. In general, the longer the time of exposure between the plates, the more effective the treatment.

The conductive coating 43, as well as the conductive coating 36, or any conductive coating employed with the main conductor, is utilized to extend or widen the field or electric source, and any material suitable for this purpose may be used. For example, the coating may consist of silicone, magnesium, barium, and zinc. Copper and lead with traces of magnesium and iron, may be also added in the coating. Since such conductive coatings for tubes and other apparatus are well known, a detailed description is believed unnecessary.

Various explanations have been suggested as to why the above-described process or apparatus is effective in changing the character of the polyethylene surface being treated to render it adherent to decorative matter. The electrostatic force field or the electrostatic potential set up is believed to bring about an electron bombardment of the polyethylene surface and such bombardment increases the number of unsaturated linkages in the polyethylene surface molecules. The corona observed during the operation is believed to be visible evidence of such flow of electrons. However, it is believed that the treatment may be effected by the electron flow even without such visible evidence.

I have found that the greater the voltage between the upper field-forming device and the lower conductor on which the polyethylene may rest, the more effective the treatment. For example, by the use of a Tesla coil, voltages have been raised from a very low voltage up to 100,000 volts and above. At extremely high voltages, the lower conductor or ground was dispensed with and effective results were obtained. Tests were carried on which showed that when input voltage was increased from 80 volts up to 12,000 volts, the treatment improved with the increase in voltage. At 15,000 volts and above, unusually effective treatment was obtained. I prefer to use a voltage in excess of 10,000 or 12,000 volts. Another advantage of the high voltage was found in the fact that the treated area was broadened, such broadening in the area of treatment being increased with the increase in applied voltage. When tubes were used in parallel arrangement, the broadening of the area of treatment caused by the increase in voltage brought about an even treatment upon the polyethylene body without requiring that the tubes be brought closely together or in overlapping relation. When the tubes were used with low voltage and were spaced apart, it was sometimes found that "banding" (the forming of untreated gaps on the film generally parallel with the tubes) occurred. However, as the input voltage to these tubes was increased, the bands of untreated stock disappeared.

As above indicated, it is believed that the electron bombardment of the polyethylene surface, wherein the energy transmission is of sufficient intensity to detach hydrogen atoms from the polyethylene molecules, produces the hydrogen atoms in sufficient numbers to create a reasonably uniform unsaturated surface. In this operation, the voltage should be sufficiently high relative to the dielectric value of the polyethylene and the air gap to bring about effective bombardment, and a voltage of from 2,000 volts upwards is desired. In addition, the frequency should be regulated to vary the speed of treatment. While very low frequencies, such as, for example, 24 cycles per second, are apparently adequate to secure treatment, I prefer at least 60 cycles per second for producing minimum commercial rates of treatment. Substantially higher and very high frequencies at a given voltage give improved treatment results. Specific examples may be set out as follows:

(1) A Tesla coil with 20,000 volts secondary output was operated at frequencies of from 10 per second to 60 per second, giving a treatment varying from adequate to heavy as the frequency was increased, for a given time exposure of 5 seconds, the discharge being from the ball on the secondary coil.

(2) A transformer with 10,000 volt output was operated at 60 cycles per second for treating film at a rate of 100 feet (linear) per minute, the discharge being through tubes, as illustrated in the drawings of the present application, adequate treatment being obtained.

(3) An operation was carried on as described in Example 2 except that the frequency was at 3.8 megacycles (provided by an electronic hook-up to a 10,000 volt primary, using the secondary of the above transformer as primary of the electronic system), the discharge being through tubes as indicated in Example 2. Highly effective treatment was obtained almost instantaneously.

(4) In apparatus similar to that shown in the drawings and employing a voltage of 15,000 volts and at a frequency of 180 cycles per second, treatment was effected at approximately 175 linear feet per minute. The frequency was obtained by driving a 120 volt generaor with three times the number of commutator points as is required for a 60-cycle output and then stepping up the voltage through the use of the transformer.

As previously stated, one problem that has been present in the treating of polyethylene and the like with an electrostatic force field has been the creation of a corona, which in turn produces ozone. Further, where the electrostatic field in itself produces the ionization of the air between the electrodes, a greater voltage is required to create the ionized path. I have found that by carrying on the treatment of polyethylene by electrical discharge in the presence of air or other gas and then ionizing the gas from a separate external source, the voltage required can be greatly increased while at the same time eliminating corona or ozone.

In the modification illustrated in Figs. 8 and 9, 50 designates a support roller receiving polyethylene film 51, which leaves the roll 52, passing first over an idler roller 53 and thence around the support roller to a rewind roller 54. Power means (not shown) brings about a rotation of the support roller 50. 55 designates a gas flame manifold, preferably providing a continuous ribbon of flame 56 directed against a baffle 57 which is effective in guiding ionized products of combustion against the outer surface of the film 51 in sufficient profusion to fill the gap between said outer surface and the wire mesh electrode 58. If desired, one or more electrodes 58 may be employed.

The use of an open wire mesh electrode has the advantage of allowing the ionized products of combustion to pass through the electrode as well as to pass through the channel between the electrode and the support roller. Further, the wire mesh electrodes have the further advantage of permitting a lower voltage to be employed. If desired, however, solid electrodes may be used, and such a structure will confine the ionized products of combustion between them and the film carried by the support roller. In this structure, the support roller, which is formed of a metal or other conducting material, is covered with a dielectric film 59, such as, for example, a film of polyethylene, styrene, glass, etc. The ionized products of combustion provide an ionized path for the electron flow between the wire mesh electrodes 58 and the film 51, and it is found that no corona need be produced while operating at desired treatment levels.

As an alternative to the use of ionized products of combustion, ultraviolet lamps or other suitable sources of ultraviolet radiation, indicated by the numeral 60, may be employed for ionizing the intervening air between the electrodes 58 and the film carried by the support roller 50. In the illustration given, the lamps are supported so as to direct ultraviolet radiation through the intervening spaces between the electrodes and through the wire mesh spaces of the electrodes so as to effectively ionize the particles in the channel space between the electrodes and the support roller. If desired, the ultraviolet lamps may be used concurrently with the flame-producing equipment, or as a complete substitute for the flame treatment. I find that very satisfactory results are produced through the use of flame and the ionized products of combustion therefrom without the assistance of ultraviolet radiation, and further find that ultraviolet radiation can also be employed alone to effect the ionization desired. It will be understood that other means for producing an ionization of the air between the electrodes and the support roller may be employed. For example, soft X-rays and similar means may be employed for producing the ionization of the air in the area indicated.

As indicated hereinbefore, avoidance of the corona and the production of ozone can be brought about through the use of high frequencies which permit a reduction in voltage. For example, at a frequency of 3.8 megacycles, effective treatment of the polyethylene or similar film can be brought about without the formation of corona or ozone, while at the same time reduced voltages may be employed. An electronic generator may be effectively employed for the production of such high frequencies, or, alternatively, a Tesla coil may be used for this purpose. High frequencies have the advantage of bringing about the necessary unsaturated condition of the molecules of the treated surface without the employment of high voltages by reason of the cumulative effect of bombardment in determining the desired treatment level.

The higher frequencies could be generated either through an electron tube frequency generator, or through the use of a low frequency transformer operating through a Tesla coil, with suitable electrical filters or chokes incorporated to screen or filter the lower frequencies which will tend to be dissipated in the system and provide a major cause for the production of corona.

If desired, the ionization of the gas about the polyethylene at the time of treatment by electrical discharge may be accomplished by radiation from a radioactive material. For example, the mesh electrode may be formed of cobalt metal which is charged to make it radioactive, and the charged electrode itself thus serves as a means for ionizing the gas about the polyethylene surface to be treated while at the same time the electrode serves as a means for producing the electrical discharge.

In most of the foregoing methods in which the polyethylene body is rendered receptive to inks, adhesives, decorative matter, etc. by exposing the surface to an electrical discharge produced in a gas without ozone formation, there is provided an external physical source separate from the electrical discharge for ionizing the gas simultaneously with the electrical discharge treatment. Such ionization is effected through flame or through the combustion products of flame, by the employment of a radioactive substance, ultraviolet radiation, X-rays, etc.

The importance of avoiding corona and the formation of ozone is realized when the corrosive effects of the operation are observed. The ozone, in the presence of moisture, will produce nitrous acid, and the nitrous acid exerts a very corrosive effect upon the equipment employed in the treating operation. Further, ozone has a very detrimental effect on the lungs when breathed in even minute quantities, and its presence is condemned by public health authorities. The processes described above are effective in the elimination of corona and the attendant formation of ozone while at the same time they substantially reduce the voltage required in the treating operation. The reduction in voltage required to effect a given level of treatment is possible because the surge of energy required to break down or ionize the air between the electrodes need not be accomplished through electrical means but the surge may be replaced as a source of ionizing energy by the means above described, thus permitting continued operation on a lower level of energy input. For example, the ionized products of combustion or the ionization produced by ultraviolet radiation, etc., relieve the electrode system of the necessity of establishing the ionized path as a precondition to electron flow or electron bombardment.

While, in the foregoing specification, I have set forth specific structures and steps in considerable detail for the purpose of illustrating embodiments of the invention, it will be understood that such details of structure and method may be varied widely by those skilled in the art without departing from the spirit of my invention.

I claim:

1. In a process for treating a polyethylene body to render a surface thereof receptive to inks, adhesives, and other decorative matter without producing ozone, the steps of exposing said surface to an electrical discharge in a gas-filled space between spaced electrodes while simultaneously and separately providing an external source of ionization for the gas other than said electrical discharge.

2. The process of claim 1, in which the separate ionization is effected through a flame, the combustion products of which are passed between said surface and the source of electrical discharge.

3. The process of claim 1, in which the separate source of ionization is a radioactive substance.

4. The process of claim 1, in which the separate source of ionization is a source of ultraviolet radiation.

5. In a process for treating a polyethylene body to render polyethylene molecules on a surface thereof unsaturated without producing corona, the steps of exposing said surface to electron bombardment in a path between spaced electrodes while simultaneously separately ionizing apart from said electron bombardment the path of electron flow.

6. The process of claim 5, in which the separate ionization of the path of electron flow is produced by passing a stream of ionized products of combustion between the source of electron bombardment and said surface.

7. In a process for treating a polyethylene body for rendering a surface thereof adherent to subsequently added ink impressions, adhesive, and other decorative matter without producing ozone, the steps of exposing the surface of the body to electron bombardment in a path between spaced electrodes while simultaneously ionizing from a separate source other than said electron bombardment the path of electron flow between said first-mentioned source and said surface.

8. In apparatus for treating a polyethylene body to render a surface thereof adherent to added materials, a support, spaced electrodes, a dielectric between said electrodes and spaced from at least one of said electrodes to provide a space through which the polyethylene may be passed, means for passing the polyethylene through said space, means for directing ionized products of combustion through said space to ionize the path of electron flow, and means for creating a voltage in one of said electrodes to produce an electron bombardment therefrom upon said surface.

9. In apparatus for the treating of a polyethylene body to render a surface thereof adherent to subsequently imprinted ink impressions, a pair of electrodes spaced apart, a dielectric between said electrodes, means for passing the polyethylene between one of said electrodes and said dielectric, means for impressing upon said electrode spaced from said dielectric an electric current under voltage sufficient to produce electron bombardment of said surface, and means other than said electron bombardment for ionizing the gas in the area between said voltage-impressed electrode and said surface.

10. In apparatus for treating a polyethylene body, a cylindrical support for polyethylene, means for passing a film of polyethylene over said support, a gas burner supported at one side of said support and adapted to supply combustion gases for movement upwardly along the polyethylene film traveling on said support, and an electrode supported along the side of said cylindrical support and spaced from said polyethylene film to provide a channel therebetween for receiving said combustion gases, and means for creating a voltage in said electrode to produce an electron bombardment upon said polyethylene film surface through said combustion gas.

11. The structure of claim 10 in which said electrode consists of a wire mesh extending in a generally vertical plane along the side of said cylindrical support.

12. The structure of claim 11 in which an ultra-violet light is supported for directing rays through said electrode mesh and upon said polyethylene.

References Cited in the file of this patent

UNITED STATES PATENTS

| 2,476,282 | Castellan | July 19, 1949 |
| 2,648,097 | Kritchever | Aug. 11, 1953 |

FOREIGN PATENTS

| 1,058,934 | France | Nov. 10, 1953 |

OTHER REFERENCES

Charlesby: Cross Linking of Polythene by Pile Radiation, Proceedings of Roy Soc. London A, vol. 215, pp. 187–191, 203–212, Nov. 25, 1952.

Irradiation of Polymers by High Energy Elections, July 11, 1953, Nature, vol. 172, p. 76.